United States Patent
Domingo et al.

(10) Patent No.: US 7,089,726 B2
(45) Date of Patent: Aug. 15, 2006

(54) CORDS FOR REINFORCING HEAVY VEHICLE TIRES

(75) Inventors: Alain Domingo, Orleat (FR); Henri Barguet, Les Martres-d'Artiere (FR); Gilles Sallaz, Ceyrat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/102,128

(22) Filed: Apr. 7, 2005

(65) Prior Publication Data

US 2006/0000199 A1  Jan. 5, 2006

Related U.S. Application Data

(63) Continuation of application No. PCT/EP2003/011111, filed on Oct. 8, 2003.

(30) Foreign Application Priority Data

Oct. 11, 2002  (FR) ................................. 02 12701

(51) Int. Cl.
*D02G 3/28* (2006.01)
(52) U.S. Cl. ...................................... 57/237
(58) Field of Classification Search .................. 57/211, 57/236–238, 902
See application file for complete search history.

(56) References Cited

U.S. PATENT DOCUMENTS 4,644,989 A  2/1987  Charvet
4,790,802 A * 12/1988 Onoe et al. .................. 474/260
6,146,760 A * 11/2000 Helfer et al. ................ 428/377
6,247,298 B1 * 6/2001 Bourgois et al. .............. 57/214
6,438,932 B1 * 8/2002 De Vos et al. ................ 57/212
6,745,806 B1 * 6/2004 Miyazaki et al. ........... 152/556

FOREIGN PATENT DOCUMENTS

| EP | 0 811 786 A | 12/1997 |
| JP | 59 067107 A | 4/1984 |
| WO | WO 90/12145 A | 10/1990 |
| WO | WO 98/41682 A | 9/1998 |

* cited by examiner

*Primary Examiner*—Shaun R Hurley
(74) *Attorney, Agent, or Firm*—Cohen, Pontani, Lieberman & Pavane

(57) ABSTRACT

A cable is disclosed that can be used to reinforce a crown protection ply and/or a stiffener (9) in tires for heavy industrial vehicles. Also disclosed are composite fabrics that can be used as crown protection plies and/or as stiffeners (9) in such tires, and the tires themselves. The cable comprises three strands twisted together in helix of pitch $p2$, each consisting of two metallic wires twisted together in helix of pitch $p1$, these wires having diameters ($d1$, $d2$), ($d1'$, $d2'$), ($d1''$, $d2''$) for the strands, respectively, such that the cable satisfies the following conditions:

| (i)   | $0.25 < d1 < 0.45$ |
| (ii)  | $0.25 < d2 < 0.45$ |
| (iii) | $0.25 < d1' < 0.45$ |
| (iv)  | $0.25 < d2' < 0.45$ |
| (v)   | $0.25 < d1'' < 0.45$ |
| (vi)  | $0.25 < d2'' < 0.45$ |
| (vii) | $2 < p1 < p2 < 10.$ |

18 Claims, 1 Drawing Sheet

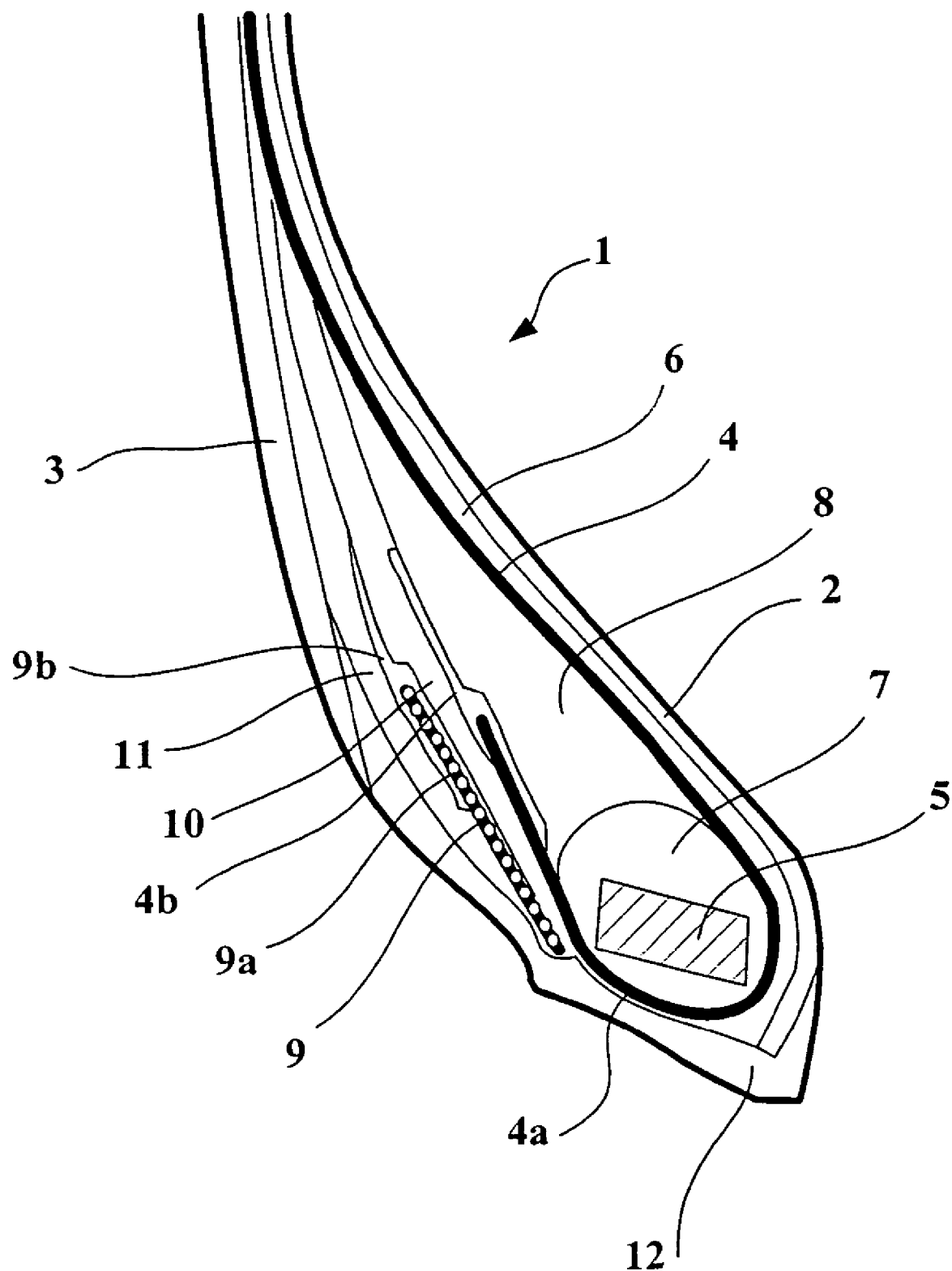

CORDS FOR REINFORCING HEAVY VEHICLE TIRES

RELATED APPLICATIONS

This is a continuation of International Application No. PCT/EP2003/011111, filed on Oct. 8, 2003, which claims priority from French Patent Application No. 02/12701, filed on Oct. 11, 2002, the content of which is hereby incorporated by reference.

FIELD OF THE INVENTION

The present invention concerns cables that can be used to reinforce tires for heavy vehicles, that is to say, industrial vehicles able to carry heavy loads, such as "heavy vehicles"—i.e. subway trains, buses, road transport vehicles (lorries, tractors, trailers), off-road vehicles, agricultural or construction machinery, aircraft, and other transport or handling vehicles.

In particular it concerns the use of such cables in protection plies for crown or carcass reinforcements, or in stiffeners for such tires. The invention also concerns composite fabrics that can be used as protection plies or stiffeners for such tires, as well as the tires themselves.

BACKGROUND OF THE INVENTION

Steel cables for tires as a rule consist of pearlitic (or ferrite-pearlite) carbon steel wires, hereinafter "carbon steel", with a carbon content generally between 0.2% and 1.2%, the diameter of these wires being most often between about 0.10 and 0.40 mm. These wires are required to have very high tensile strength, generally higher than 2000 MPa and preferably higher than 2500 MPa, obtained thanks to the structural hardening that takes place during the cold drawing of the wires. The wires are then assembled in the form of cables or strands, and this also requires the steels used to have sufficient torsional ductility to withstand the cabling operations.

In a known way, tires for industrial vehicles such as heavy vehicles usually comprise a carcass reinforcement anchored in two beads and surmounted radially by a crown reinforcement comprising one or more working crown plies and one or more crown protection plies over the working crown ply or plies, the said crown reinforcement itself being surmounted by a tire tread joined to the beads by two sidewalls.

The protection plies, which can be deformed thanks to a degree of elasticity, are mainly intended to impede the penetration of foreign bodies radially into the tire during rolling.

To reinforce the protection plies of tires for industrial vehicles such as heavy vehicles, nowadays it is customary to use strand cables (or strand "cords" in English), which are ssembled by the known technique of stranding and consist, by definition, of a plurality of metallic strands twisted together in helix, each strand comprising steel wires also twisted together in helix. Note that most of the wires used in these cables for crown protection plies have a diameter typically above 0.20 mm, for example close to 0.30 mm, this diameter being in particular larger than that of the wires used in the carcass reinforcement of heavy-vehicle tires.

As strand cables currently used to reinforce the crown protection plies of heavy-vehicle tires, one may mention for example a cable with the formula (4×2), consisting of 4 strands twisted together in helix, each consisting of 2 metallic wires twisted together in helix.

The cables for crown protection plies are designed on the one hand to confer optimum flexibility on the ply containing them, so that the crown protection ply can best conform to the shape of an obstacle it encounters during rolling, and on the other hand to allow the ply to resist the penetration of foreign bodies radially into it.

Note also that these strand cables must be as thoroughly impregnated as possible by the rubber, so that the latter penetrates into all the spaces between the wires constituting the cables. In effect, if this penetration is insufficient, empty channels form along the cables and corrosive agents such as water, which can penetrate into tires for example due to cuts or other aggressions of the tire's crown reinforcement, make their way along those channels through the said reinforcement. The presence of this moisture plays an important part in causing corrosion and accelerating the processes of fatigue ("fatigue-corrosion" phenomena) compared with use in a dry atmosphere.

On the other hand, each bead of a tire for a heavy industrial vehicle is generally provided with a stiffener designed to reinforce it, each stiffener comprising at least one ply of cables extending axially on the outside of the upturn of the carcass ply. These cables make an angle generally between 15° and 30° relative to the circumferential direction of the tire. In some cases each stiffener can extend along the upturn of the carcass ply both axially outside and radially inside the upturn, essentially forming an L when viewed in the meridian cross-section of the tire.

These stiffeners have an overall damping function which tends in particular to minimise the phenomenon of "deradialisation" of the carcass reinforcement of the tire each time it is flattened against the ground over which it is rolling, by taking up the compression forces connected with the flattening and minimising the wear against the rim.

To reinforce the plies, constituting these stiffeners, the cables most often used are layered steel cables consisting of a central core and one or more concentric layers of wires arranged around the core.

The most widely used layered cables in these stiffeners for heavy-vehicle tires are ones having the formula (L+M) or (L+M+N). As is known, these cables are formed of a core of L wire(s) surrounded by at least one layer of M wires itself sometimes surrounded by an outer layer of N wires, L generally varying from 1 to 4, M from 3 to 12, N from 8 to 20, depending on the case, and the whole if necessary being surrounded by a wrapping wire wound around the last layer.

Like the cables for crown protection plies, it is also important that these layered cables for stiffeners are as fully impregnated as possible by the rubber, so that it will penetrate between the wires constituting the cables to prevent corrosive agents from making their way into empty channels along the cables.

For example, layered cables of structure (3+9+15) have been described, which consist of an inside layer of 3 wires surrounded by an intermediate layer of 9 wires and a saturated outer layer of 15 wires, for example provided with a wrapping wire, as described in the documents EP-A-176 139 (or U.S. Pat. No. 4,651,513), EP-A-497 612(or U.S. Pat. No. 5,285,836), EP-A-669 421 (or U.S. Pat. No. 5,595,057), EP-A-709 236 (or U.S. Pat. No. 5,836,145),EP-A-744 490 (or U.S. Pat. No. 5,806,296) or EP-A-779 390 (or U.S. Pat. No. 5,802,829).

A major disadvantage of these cables with formula (3+9+ 15) is that they cannot be penetrated throughout by the rubber, in particular because of the saturated structure of the outer layer and the presence of a channel or capillary at the centre of the three core wires, which remains empty after impregnation by the rubber and is therefore available for the propagation of corrosive agents such as water.

SUMMARY OF THE INVENTION

One object of the present invention is to provide a new strand cable that can be used in particular to reinforce a crown protection ply or even a stiffener of a tire casing for an industrial vehicle, such as a heavy vehicle, which is less voluminous and cheaper to make compared with the volume and cost of the strand cables of structure (4×2) known for the reinforcement of crown protection plies in heavy-vehicle tires (by virtue of the smaller number of strands forming a triangular cross-section), while conferring on the crown protection plies a corrosion resistance of the same order as that conferred by the (4×2) strand cables.

Another object of the present invention is to provide a new strand cable that can be used in particular to reinforce a crown protection ply or even a stiffener of a tire casing for an industrial vehicle, such as a heavy vehicle, which confers on the one hand improved endurance on beads whose stiffeners incorporate the cables according to the invention, compared with that conferred by the known layered cables of structure (3+9+15) used in stiffeners, and on the other hand also improved corrosion resistance of the stiffeners incorporating them (by virtue of better rubber impregnation), compared with that conferred by the said layered cables of structure (3+9+15).

This and other objects are attained in accordance with one aspect of the invention directed to a cable comprising three strands twisted together in helix of pitch $p_2$, each consisting of two metallic wires twisted together in helix of pitch $p_1$, the wires of each strand and the strands being twisted together in the same twist direction S/S or Z/Z, the two wires of each of the three strands having diameters ($d_1$, $d_2$), ($d_1'$, $d_2'$), ($d_1''$, $d_2''$), respectively, and the said cable satisfying all of the following conditions:

| (i) | $0.25 < d_1 < 0.45$ |
| (ii) | $0.25 < d_2 < 0.45$ |
| (iii) | $0.25 < d_1' < 0.45$ |
| (iv) | $0.25 < d_2' < 0.45$ |
| (v) | $0.25 < d_1'' < 0.45$ |
| (vi) | $0.25 < d_2'' < 0.45$ |
| (vii) | $2 < p_1 < p_2 < 10$ |

Applicants have discovered that, unexpectedly, such a cable can be used with advantage to reinforce at least one crown protection ply and/or a stiffener of a tire for a heavy industrial vehicle, and confers on the said crown ply and/or the said stiffener the advantages mentioned above.

A cable according to an embodiment of the invention also satisfies the following condition:

$$3 < p_1 < p_2 < 8. \quad \text{(viii)}$$

A cable according to an embodiment of the invention also satisfies the condition:

$$0.5 < p_1/p_2 < 0.75. \quad \text{(ix)}$$

According to an embodiment of the invention, the cable has a structural elongation As, measured in tension in accordance with the standard ISO 6892 of 1984, which is greater than 0.25%.

According to another embodiment of the invention, the cable has an elongation at break At, measured in tension in accordance with the standard ISO 6892 of 1984, which is greater than 3.3%.

Note that this elongation at break At is defined as representing the sum of the structural elongation As, the elastic elongation Ae and the plastic elongation Ap.

This high value of the elongation at break At of the cables essentially confers upon crown protection plies reinforced with these cables, on the one hand, elasticity during the fabrication of the tire, and on the other hand, lower rigidity when subjected to stress during rolling. This reduced tension of the crown protection plies reinforced with such cables results, when the ply is subjected to severe stress during rolling, in a reduced sensitivity of such plies to the propagation of cuts and in particular to corrosion damage.

According to another embodiment of the invention, the said cable has a Young's modulus E, measured in tension in accordance with the standard ISO 6892 of 1984, lower than 125 GPa.

A cable according to an embodiment of the invention has a mass per unit length smaller than or equal to 5.50 g/m. Also, a cable according to an embodiment of the invention has a total diameter smaller than or equal to 1.40 mm.

The metallic wires making up the strands of the cable according to an embodiment of the invention consist of steel whose carbon content ranges from 0.2 to 1.2% and is preferably between 0.5 and 1.0%.

Another object of the invention is to provide a composite tire fabric that can in particular be used as a protection ply and/or a stiffener for a tire casing of a heavy industrial vehicle, the said fabric comprising a rubber composition based on at least one diene elastomer reinforced by reinforcing elements that consist of the cables according to the invention mentioned above.

As is known, "diene elastomer" means an elastomer obtained at least in part (i.e. a homopolymer or copolymer) from diene monomers, i.e. ones with two carbon-carbon double bonds, whether conjugated or not.

The diene elastomer of the composition according to an embodiment of the invention is preferably "essentially unsaturated", i.e. it comprises a molar ratio of conjugated diene units greater than 15% (% by weight). More preferably still, the diene elastomer of the composition is said to be "highly unsaturated", i.e. having a molar ratio of conjugated diene units greater than 50%.

Even more preferably, the said diene elastomer belongs to the group consisting of polybutadienes, natural rubber, synthetic polyisoprenes, copolymers of butadiene-stirene, copolymers of isoprene-butadiene, copolymers of isoprene-stirene, copolymers of butadiene-stirene-isoprene, and mixtures of these elastomers.

More preferably still, the said rubber composition is based on natural rubber or synthetic polyisoprene.

However, according to an embodiment of the invention one may also use blends of natural rubber or synthetic polyisoprene with other "highly unsaturated" diene elastomers, in particular with copolymers of stirene and butadiene or with polybutadienes.

Of course, the elastomer matrix of a composite fabric of the invention may contain one or more diene elastomers, the latter being able to be used in association with any type of non-diene synthetic elastomer, or with polymers other than elastomers, for example thermoplastic polymers.

The rubber compositions of the composite fabrics according to the invention also comprise all or part of the additives customarily used in tire manufacture, for example reinforcing fillers such as carbon black and/or an inorganic reinforcing filler such as silica, anti-ageing agents, for example anti-oxidants, extender oils, plasticisers or agents that facilitate the use of the compositions in the uncured state, a cross-linking system based on either sulphur or sulphur and/or peroxide donors, accelerators, vulcanisation activators or retarders, methylene acceptors and donors, resins, known adhesion promoting systems of the "RFS" type (resorcinol-formaldehyde-silica) or metallic salts, such as cobalt salts.

The composite fabric according to an embodiment of the invention may take various forms, for example the form of a ply, a strip, a narrow strip or a block of rubber incorporating the metallic reinforcement with the help of various means known to those familiar with the field, such as means for moulding, calendering or pressing.

In the composite fabric according to an embodiment of the invention, the cables are arranged parallel to one another, on the one hand with a density (denoted "d") of cables per dm of fabric, and on the other hand with a rubber "bridge" width between two adjacent cables (this width hereinafter denoted "ΔL", expressed in mm, representing in a known way the difference between the calendering interval or positioning interval of the cable in the fabric, and the diameter of the said cable), d and ΔL being specifically determined having regard to the specific reinforcement sought in the present invention, i.e. for the reinforcement of a protection ply and/or a stiffener.

In the composite fabric according to an embodiment of the invention the axis-to-axis distance between two adjacent cables is preferably between 2 and 4 mm. Below the minimum value indicated, the rubber bridge is too narrow and risks becoming mechanically degraded during the work of the ply, especially during deformations in its own plane by extension or shear. Above the maximum indicated, there is a risk of perforation between the cables.

Note that the composite fabric according to an embodiment of the invention has a cable density d preferably between 20 and 60 cables per dm of fabric and, more preferably still, between 30 and 50 cables per dm of fabric.

Another characteristic of this composite tissue according to an embodiment of the invention is that the width ΔL of the rubber composition bridge between two adjacent cables is between 0.5 and 1.3 mm, and preferably this width ΔL is between 0.6 and 1.0 mm.

According to a further characteristics of the composite fabric according to an embodiment of the invention, when the said fabric is used as a protection ply especially for a crown reinforcement of a tire for a heavy industrial vehicle, the said rubber composition in the cross-linked state has a secant modulus M10 between 5 and 12 MPa, measured in accordance with the standard ASTM D 412.

According to another characteristic of the composite fabric according to an embodiment of the invention, when the said fabric is used to make up a tire bead stiffener for a heavy industrial vehicle, the said rubber composition in the cross-linked state has a secant modulus M10 between 7 and 15 MPa measured in accordance with the standard ASTM D 412.

It is within these modulus ranges that the best compromise of the endurance of the cables according to an embodiment of the invention and the fabrics incorporating them has been observed.

A tire according to an embodiment of the invention for a heavy industrial vehicle comprises a carcass reinforcement which is anchored in two beads and is surmounted radially by a crown reinforcement comprising on the one hand one or more working crown plies, and on the other hand one or more crown protection plies over the working crown ply or plies, the crown reinforcement itself being surmounted by a tread connected to the beads by two sidewalls; at least one of the crown protection plies in the tire comprises a composite fabric according to the invention as defined above.

A tire according to another embodiment of the invention for a heavy industrial vehicle comprises in a known way a carcass reinforcement which is anchored in two beads around two bead wires by forming respectively two upturns axially outside the bead wires and is surmounted radially by a crown reinforcement itself surmounted by a tread connected to the beads by two sidewalls, each bead comprising a stiffener designed to reinforce it, each stiffener extending axially outside the upturn of the carcass reinforcement and comprising at least one ply of metallic cables that form an angle preferably of between 15° and 30° relative to the circumferential direction of the tire; the tire is characterised in that at least one of the said stiffeners comprises a composite fabric according to the invention as defined earlier.

According to another embodiment of the invention, each of the stiffeners extends along the said upturn of the carcass reinforcement axially on the outside and radially on the inside thereof, so forming essentially an L when viewed in the meridian cross-section of the said tire.

BRIEF DESCRIPTION OF THE SINGLE DRAWING

The above features and others will be better understood on reading the following description of several embodiments of the invention, given for illustrative and non-limiting purposes, the description referring to the attached drawing in which the sole FIGURE is a view in meridian cross-section of a sidewall bead of a heavy-vehicle tire according to an example embodiment of the invention.

DETAILED DESCRIPTION OF THE DRAWING

The sole FIGURE shows a sidewall bead 1 of a tire delimited axially on the inside by an internal elastomer sealing layer impermeable to the inflation gas, and axially on the outside by an outer sidewall elastomer layer 3. It is understood that this description of the bead 1 applies identically to the other bead of the tire.

The sole FIGURE also shows a carcass ply 4 of metallic cables anchored in the bead 1 around a metallic bead wire 5 by forming an upturn 4a axially outside the latter, this upturn 4a being extended radially outwards by an elastomer edge strip 4b.

A reinforcing elastomer layer 6 provided between the carcass ply 4 and the internal sealing layer 2 is designed to reinforce the ply 4 and the layer 2, ensuring their mechanical connection to one another and protecting the ply 4 against aggressions such as diffusion of the inflation gas.

The bead wire 5, which has a rectangular cross-section in the example shown in the sole FIGURE, is surrounded by an elastomer layer 7 of essentially circular cross-section designed to ensure satisfactory contact with the carcass ply 4 around the upturn 4a.

The bead 1 also comprises an elastomer filling layer 8 provided radially outside the bead wire 5 between the two portions of the carcass ply 4 located on either side of the upturn 4a (the example in the sole FIGURE shows this layer 8 in contact with the carcass ply 4, the edge strip 4b and the layer 7 surrounding the bead wire 5).

The bead 1 also comprises a stiffener 9 designed to reinforce it and formed of a ply of metallic cables 9a according to the invention extending axially outside the upturn 4a of the carcass ply 4 and making an angle preferably of between 15° and 30° relative to the circumferential direction of the tire. The example in the sole FIGURE shows that the said stiffener is extended radially outwards by an edge strip 9b.

Between the stiffener 9 and the upturn 4a there is an elastomer layer 10 designed to reinforce the stiffener 9, which extends axially in contact with the latter, with the upturn 4a and with the filling layer 8 in the example shown in the sole FIGURE.

Between the stiffener 9 and the outer sidewall layer 3 there is another reinforcing elastomer layer 11 which extends radially from the inside outwards, in contact with the stiffener 9, the edge strip 9a and the layer 10.

In this example embodiment the bead 1 also comprises a protective elastomer layer 12 designed to ensure contact between the bead 1 and the wheel rim, and delimiting the bead 1 radially on the inside by connecting the outer sidewall layer 3 to the inner sealing layer 2. As can be seen in the sole FIGURE, this protective layer 12 extends axially from the outside of the bead 1 inwards, in contact with the reinforcing layer 11, the stiffener 9, the upturn 4a and the reinforcing layer 6, and the said layer 12 covers the inner sealing layer 2 axially on the inside, essentially forming an L when viewed in the meridian cross-section of the tire.

Examples of Cables According to the Invention Compared with "Control" Cables:

1) Use in a crown protection ply of a heavy-vehicle tire:

Below, details are given of the mechanical properties and production of a cable $C_i$ according to the invention, having the formula "6.35" (three identical strands each of two wires, with a wire diameter equal to 0.348 mm), compared with those of a "control" cable $C_{T1}$ usually used in crown protection plies and having the formula "8.35" (four identical strands each of two wires, with a wire diameter equal to 0.348 mm).

a) The cable $C_i$ of the invention has a pitch p1 of 3.96 mm between two wires of the same strand and a pitch p2 of 6.09 mm between strands. In addition, the wires of each strand and the three strands are twisted together in the same twist direction S/S.

This cable $C_i$ was obtained in two operations:

Each strand was made from a rotating feed spool by steady twisting by a pulley-type twister and without straightening. To do this a "BRD" machine of type "96" was used.

The three strands were also assembled from a rotating feed and using the above machine, by steady twisting by the said pulley-type twister.

b) The "control" cable $C_{T1}$ has a pitch p1 of 3.98 mm between two wires of the same strand and a pitch p2 of 8.23 mm between strands. In addition, the wires of each strand and the four strands are all twisted together in the same twist direction S/S.

Table 1 below shows the main characteristics of these two cables, the measurements having been made on cables taken in isolation (i.e. before their incorporation in the composite fabric).

TABLE 1

|  | Cable $C_{T1}$ << 8.35 >> | Cable $C_i$ << 6.35 >> |
|---|---|---|
| Breaking load Fm (N) | 1501.0 | 1135.3 |
| Mass per unit length (g/m) | 6.258 | 5.062 |
| Overall diameter (mm) | 1.49 | 1.39 |
| Young's modulus E (GPa) | 119 | 103 |
| Structural elongation As (%) | 0.60 | 0.28 |

TABLE 1-continued

|  | Cable $C_{T1}$ << 8.35 >> | Cable $C_i$ << 6.35 >> |
|---|---|---|
| Plastic elongation Ap (%) | 1.06 | 1.42 |
| Elongation at break At (%) | 3.24 | 3.39 |

2) Use in the stiffeners of a heavy-vehicle tire:

Below, the mechanical properties of the cable $C_i$ according to the invention, with formula "6.35", will be compared with those of another "control" cable $C_{T2}$ usually used to reinforce the composite fabrics of stiffeners, having the formula "27.18 FR" (a wrapped layered (3+9+15) cable comprising an inner layer $C_1$ of 3 wires, an intermediate layer $C_2$ of 9 wires, a saturated outer layer $C_3$ of 15 wires and a wrap wound over this outer layer, with a wire diameter of 0.18 mm).

For the layers $C_1$ to $C_3$, the cable $C_{T2}$ has pitches p1, p2, p3 respectively of 6.5 mm, 12.0 mm and 13.0 mm. The wrap winding pitch is 2.8 mm. In addition, these windings of the layers $C_1$ to $C_3$ and of the wrap are made in the twist directions S/S/Z/S.

Table 2 below compares the main properties of the cables $C_{T2}$ and $C_i$, the measurements again being made on cables taken in isolation.

TABLE 2

|  | Cable $C_{T2}$ << 27.18 FR >> | Cable $C_i$ << 6.35 >> |
|---|---|---|
| Breaking load Fm (N) | 1720.0 | 1135.3 |
| Mass per unit length (g/m) | 5.370 | 5.062 |
| Overall diameter (mm) | 1.38 | 1.39 |
| Young's modulus E (GPa) | from 170 to 180 | 103 |
| Structural elongation As (%) | 0 | 0.28 |
| Plastic elongation Ap (%) | 0.60 | 1.42 |
| Elongation at break At (%) | from 2.1 to 2.6 | 3.39 |

Endurance Tests of Tires Whose Stiffeners are Reinforced with the Cables $C_i$ According to the Invention or by the "Control" Cables $C_{T2}$:

Rolling tests were carried out with tires $P_i$ according to the invention and "control" tires $P_{T2}$, each tire tested being of the heavy-vehicle type and of size "315/80 R22.5" inflated to a pressure of 8 bars, to compare the endurance of the tires $P_i$ with that of the tires $P_{T2}$.

Each "control" tire $P_{T2}$ comprises in particular:

in its crown protection ply, known strand cables of the formula "18.23" (having three metallic strands each consisting of five wires twisted in helix around a core wire), arranged with a pitch of 2.5 mm between cables. The cable density d is thus 40 per dm of fabric and the width ΔL of the rubber bridges is 1.04 mm (the diameter of each cable being 1.46 mm);

in its two crossed working crown plies, unwrapped layered cables of formula "11.35" (11 wires with a diameter close to 0.35 mm) arranged in these plies at intervals of 2.5 mm;

in its stiffeners (as illustrated in the sole FIGURE), the said "control" layered cables $C_{T2}$ of formula "27.18 FR" arranged with an interval between cables of 1.8 mm. The density d of the cables $C_{T2}$ is therefore 55 per dm of fabric and the width ΔL of the rubber "bridges" is 0.42 mm.

Each tire $P_i$ according to the invention comprises in particular:

in its crown protection ply the strand cables $C_i$ according to the invention, of formula "6.35", arranged with an interval between cables of 2.25 mm. The density of the cables $C_i$ is thus 44 per dm of fabric and the width $\Delta L$ of the rubber "bridge" is 0.86 mm (the diameter of each cable being 1.39 mm);

in its two crossed working crown plies, the said layered cables of formula "11.35" arranged with an interval between cables of 2.5 mm;

in its stiffeners (as illustrated in the sole FIGURE), the said strand cables $C_i$ arranged with an interval between cables of 2.25 mm, a cable density of 44 per dm of fabric and a rubber bridge width $\Delta L$ of 0.86 mm. The module M10 of the rubber composition in the stiffeners is essentially equal to 10 MPa, and this rubber composition is based on natural rubber.

The rolling tests were carried out under a load of about 5 150 kg on each tire at a rolling speed of 57 km/h and at a temperature of 25° C.

The criterion for stopping the rolling is the first detection in time, at the end of a defined critical number of kilometers, of a break in the beads of a tire.

Table 3 below shows, as relative values, the mean critical kilometer distance obtained with the tires $P_i$ according to the invention, taking as reference the mean critical kilometer distance obtained with the "control" tires $P_{T2}$ expressed as the base 100. For these tires $P_i$, the mean critical kilometer distance obtained is thus expressed as a percentage of the corresponding kilometer distance obtained with the "control" tires $P_{T2}$.

TABLE 3

|  | "Control" tires $P_{T2}$ | Tires according to the invention $P_i$ |
| --- | --- | --- |
| Mean critical kilometer distance (before bead break) | 100 | 154 |

Thus, the tests show that the stiffeners containing the strand cables $C_i$ according to the invention, of structure (3×2), confer a greatly improved endurance on the beads of the tires $P_i$ that incorporate them, the mean kilometer distance obtained without breakage of these beads being increased by over 50% compared with that of the "control" tires $P_{T2}$ whose stiffeners contain the layered cables $C_{T2}$ of formula (3+9+15).

Those with knowledge of the subject will easily understand that the examples described above concerning the use of cables according to the invention in the crown protection plies or bead stiffeners of heavy-vehicle tires could be extended to other types of protection plies, for example in the sidewalls of tires for construction machines or agricultural tires, and also to other types of stiffeners.

We claim:

1. Strand cable comprising three strands twisted together in helix with pitch p2, each consisting of two metallic wires twisted together in helix with pitch p1, the wires of each strand and the strands being twisted together in the same twist direction S/S or Z/Z and the two wires of each of the three strands having diameters (d1, d2), (d1', d2'), (d1", d2"), respectively, such that the cable as a whole satisfies the following conditions:

| (i) | 0.25 < d1 < 0.45 |
| --- | --- |
| (ii) | 0.25 < d2 < 0.45 |
| (iii) | 0.25 < d1' < 0.45 |
| (iv) | 0.25 < d2' < 0.45 |
| (v) | 0.25 < d1" < 0.45 |
| (vi) | 0.25 < d2" < 0.45 |
| (vii) | 2 < p1 < p2 < 10. |

2. Cable according to claim 1, wherein the following condition is satisfied:

$$3 < p1 < p2 < 8. \qquad \text{(viii)}$$

3. Cable according to claim 1, wherein the following condition is satisfied:

$$0.5 < p1/p2 < 0.75. \qquad \text{(ix)}$$

4. Cable according to claim 1, wherein the cable has a structural elongation As, measured in tension in accordance with the standard ISO 6892 of 1984, which is higher than 0.25%.

5. Cable according to claim 1, wherein the cable has an elongation at break At, measured in tension in accordance with the standard ISO 6892 of 1984, which is higher than 3.3%.

6. Cable according to claim 1, wherein the cable has a Young's modulus E, measured in tension in accordance with the standard ISO 6892 of 1984, which is lower than 125 GPa.

7. Cable according to claim 1, wherein the cable has a mass per unit length lower than or equal to 5.50 g/m.

8. Cable according to claim 1, wherein the cable has an overall diameter smaller than or equal to 1.40 mm.

9. Composite fabric comprising a rubber composition based on at least one diene elastomer which is reinforced by reinforcing elements, wherein said reinforcing elements consist of cables according to claim 1.

10. Composite fabric according to claim 9, wherein said diene elastomer belongs to the group consisting of the polybutadienes, natural rubber, the synthetic polyisoprenes, the copolymers of butadiene-stirene, the copolymers of isoprene-butadiene, the copolymers of isoprene-stirene, the copolymers of butadiene-stirene-isoprene, and mixtures of these elastomers.

11. Composite fabric according to claim 10, wherein said rubber composition is based on natural rubber.

12. Composite fabric according to claim 9, comprising said cables with a cable density d between 20 and 60 cables per dm of fabric.

13. Composite fabric according to claim 9, wherein the width $\Delta L$ of the bridge of rubber composition between two adjacent cables is between 0.5 and 1.3 mm.

14. Composite fabric according to claim 9, which can be used as a crown protection ply of a tire casing for a heavy industrial vehicle, wherein in the cross-linked condition said rubber composition has a secant modulus M10 between 5 and 12 MPa, as measured in accordance with the standard ASTM D 412.

15. Composite fabric according to claim 9, which can be used to form a stiffener in a tire casing for a heavy industrial vehicle, wherein in the cross-linked condition the said rubber composition has a secant modulus M10 between 7 and 15 MPa, as measured in accordance with the standard ASTM D 412.

16. Tire for an industrial vehicle, comprising a carcass reinforcement (4) anchored in two beads (1) and surmounted radially by a crown reinforcement comprising, on the one hand one or more working crown plies, and on the other hand one or more crown protection plies surmounting the said working crown ply or plies, said crown reinforcement itself being surmounted by a tread connected to the said beads (1) by two sidewalls, wherein at least one of said crown protection plies comprises a composite fabric according to claim 9.

17. Tire for an industrial vehicle, comprising a carcass reinforcement (4) anchored in two beads (1) around two bead wires (5) by forming respectively two upturns (4*a*) axially outside the said bead wires (5), each bead (1) comprising a stiffener (9) designed to reinforce it, each stiffener (9) extending axially on the outside of one of the said upturns (4*a*) of the carcass reinforcement (4) and comprising at least one ply of metallic cables (9*a*), wherein at least one of said stiffeners (9) comprises a composite fabric according to claim 9.

18. Tire according to claim 17, wherein each of said stiffeners (9) extends along the said upturn (4*a*) of the carcass reinforcement (4) axially on the outside and radially on the inside of the latter, to form essentially an L shape when viewed in the meridian cross-section of the tire.

* * * * *